United States Patent [19]
Brodsky

[11] Patent Number: 5,864,214
[45] Date of Patent: *Jan. 26, 1999

[54] STORAGE COMPARTMENT SENSOR SYSTEM FOR USE WITH AN AUTOMOTIVE VEHICLE

[75] Inventor: Steven L. Brodsky, New Boston, Mich.

[73] Assignee: ASC Incorporated, Southgate, Mich.

[ * ] Notice: The term of this patent shall not extend beyond the expiration date of Pat. No. 5,654,615.

[21] Appl. No.: 847,569

[22] Filed: Apr. 24, 1997

Related U.S. Application Data

[63] Continuation of Ser. No. 356,729, Dec. 15, 1994, Pat. No. 5,654,615.

[51] Int. Cl.$^6$ ................................. H02P 1/22; B06J 7/08
[52] U.S. Cl. ........................ 318/282; 318/286; 318/266; 318/467; 296/107; 296/136
[58] Field of Search ..................... 318/138, 139, 318/282, 286, 266, 467, 54, 55, 77, 460–469, 260–293; 296/122, 107, 108, 121, 117, 226, DIG. 5, 223, 112, 115; 236/49.3, 1 R, 91 C, 2.01

[56] References Cited

U.S. PATENT DOCUMENTS

| | | |
|---|---|---|
| 2,007,873 | 7/1935 | Pulin . |
| 2,704,225 | 3/1955 | Anschuetz et al. . |
| 2,939,742 | 6/1960 | Dardarian et al. . |
| 3,761,658 | 9/1973 | Loose et al. . |
| 3,784,769 | 1/1974 | Bryll . |
| 3,845,261 | 10/1974 | Blinkilde . |
| 3,859,485 | 1/1975 | Blinkilde et al. . |
| 4,107,645 | 8/1978 | Lewis et al. . |
| 4,317,011 | 2/1982 | Mazuk . |
| 4,423,294 | 12/1983 | Walser et al. . |
| 4,438,301 | 3/1984 | Van Zeeland . |
| 4,489,302 | 12/1984 | Eventoff . |
| 4,515,999 | 5/1985 | Harper . |
| 4,562,315 | 12/1985 | Aufderheide . |
| 4,720,133 | 1/1988 | Alexander et al. . |
| 4,749,193 | 6/1988 | Hacker . |
| 4,766,356 | 8/1988 | Handa et al. . |
| 4,835,449 | 5/1989 | Huehn . |
| 4,854,634 | 8/1989 | Shiraishi et al. . |
| 4,918,360 | 4/1990 | Tanaka et al. . |
| 4,920,343 | 4/1990 | Schwartz . |
| 4,958,882 | 9/1990 | Kolb . |
| 4,983,896 | 1/1991 | Sugiyama et al. . |
| 4,990,900 | 2/1991 | Kikuchi . |
| 5,051,672 | 9/1991 | Yaguchi . |
| 5,054,686 | 10/1991 | Chuang . |
| 5,090,764 | 2/1992 | Kogawa . |
| 5,195,798 | 3/1993 | Klein et al. . |
| 5,225,747 | 7/1993 | Helms et al. . |
| 5,228,562 | 7/1993 | Bulk . |
| 5,250,882 | 10/1993 | Odoi et al. . |
| 5,298,706 | 3/1994 | English et al. . |
| 5,329,079 | 7/1994 | English et al. . |
| 5,360,955 | 11/1994 | English et al. . |
| 5,399,950 | 3/1995 | Lu et al. . |
| 5,401,922 | 3/1995 | Asta . |
| 5,451,849 | 9/1995 | Porter et al. . |
| 5,490,709 | 2/1996 | Rahn .......................... 296/122 |
| 5,521,474 | 5/1996 | Hahn . |

FOREIGN PATENT DOCUMENTS 2-144226   6/1990   Japan .

OTHER PUBLICATIONS

Back cover of "Full Line Mitsubishi" brochure 95, © 1994, Mitsubishi Motor Sales of America, Inc.

"The New York Times", Sports section, Dec. 12, 1993, Article About Cars Uh, What I Meant to Say Was. . . , Marshall Schuon, p. 29.

*Primary Examiner*—Paul Ip
*Attorney, Agent, or Firm*—Harness, Dickey & Pierce, P.L.C.

[57] ABSTRACT

A sensor system is located in a storage compartment of an automotive vehicle for preventing full retraction of a convertible roof when an undesired object is detected within the storage compartment.

45 Claims, 6 Drawing Sheets

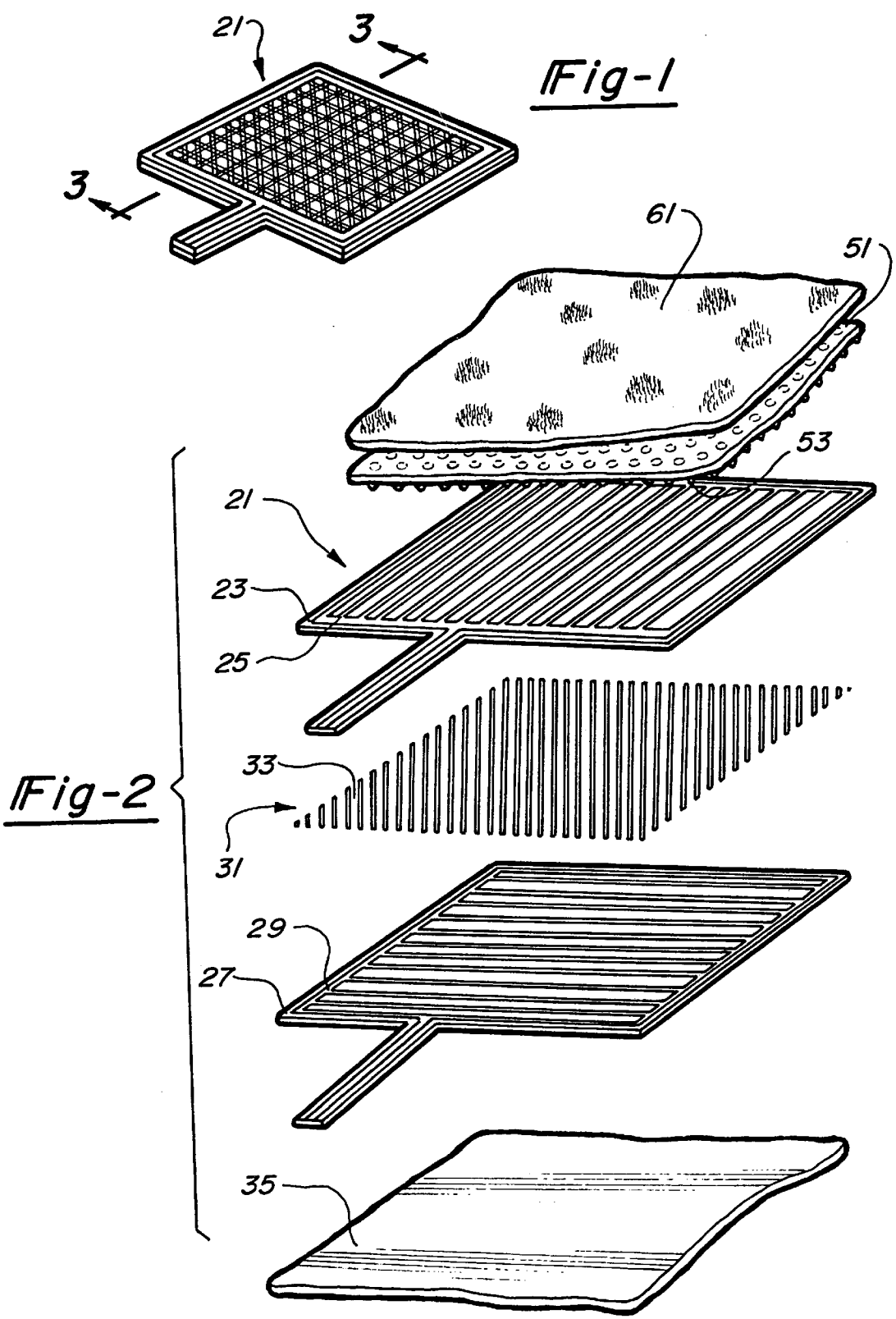

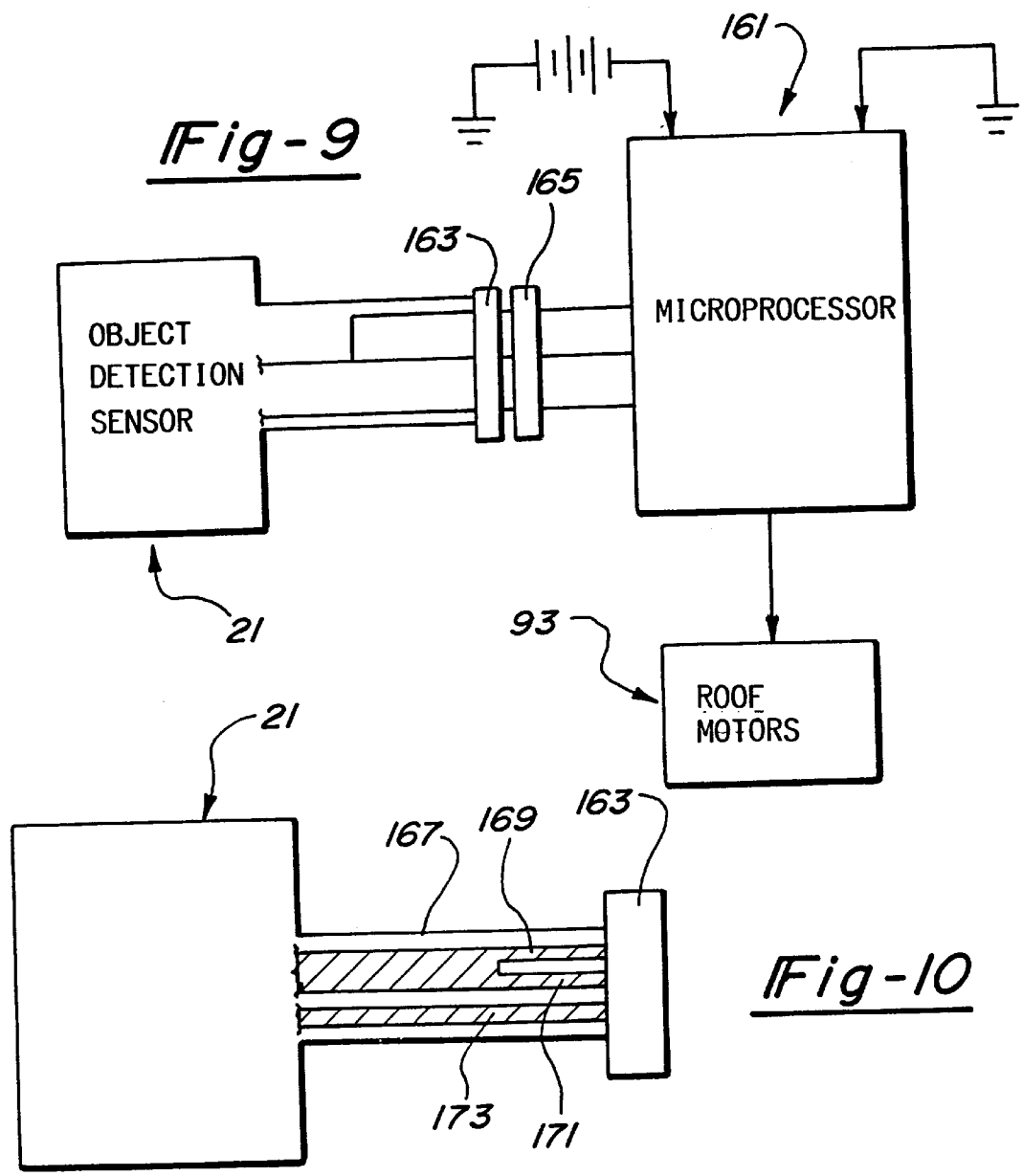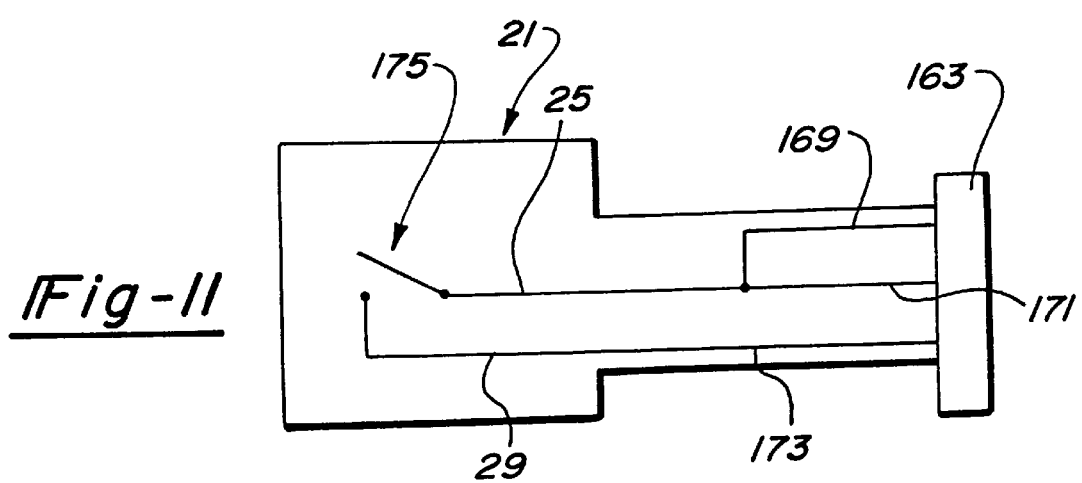

STORAGE COMPARTMENT SENSOR SYSTEM FOR USE WITH AN AUTOMOTIVE VEHICLE

BACKGROUND AND SUMMARY OF THE INVENTION

This is a continuation of U.S. patent application Ser. No. 08/356,729, filed Dec. 15, 1994, now U.S. Pat. No. 5,654,615.

This invention relates generally to automotive vehicles having convertible roofs and specifically to a sensor system for detecting undesired objects in a convertible roof storage compartment.

Convertible roofs are commonly provided on many automotive vehicles. These convertible roofs are movable from a raised position attached to a front windshield header to a lowered or stowed position within a storage compartment. Traditionally, the storage compartment is located within a trunk space which is accessible by opening a trunk or deck lid about a rear pivot. The storage space is alternately between a rearmost passenger seat and a trunk, and is often called a boot.

Conventional convertible roofs include both hard-top and soft-top constructions. Examples of such conventional hard-top systems are disclosed within the following U.S. Pat. Nos.: 5,195,798 entitled "Retractable Roof for Vehicles" which issued to Klein et al. on Mar. 23, 1993; 4,854,634 entitled "Upper Body Structure for a Convertible Vehicle" which issued to Shiraishi et al. on Aug. 8, 1989; 2,939,742 entitled "Foldable Vehicle Top" which issued to Dardarian et al. on Jun. 7, 1960; 2,704,225 entitled "Convertible Automobile Top" which issued to Anschuetz et al. on Mar. 15, 1955; and, 2,007,873 entitled "Vehicle Body Top Capable of Being Stowed Away" which issued to Paulin on Jul. 9, 1935. Examples of conventional soft-top convertible roofs include U.S. Pat. NO. 4,720,133 entitled "Convertible Top Structure" which issued to Alexander et al. on Jan. 19, 1988; and, U.S. Pat. No. 4,958,882 entitled "Folding Top for Vehicles" which issued to Kolb on Sep. 25, 1990. The disclosures of all the afore-mentioned conventional convertible roof patents are incorporated by reference herewithin.

Objects left in the trunk or boot storage compartments can cause a severe problem upon retraction of these convertible roofs. A jack, briefcase or even an object as small as a golf ball can break a glass backlite and bend linkages when inadvertently pressed thereagainst. The likelihood of such an event is further heightened with the ever increasing use of electric motors to automatically drive the convertible top-stack linkages.

Unrelated to convertible roofs, occupant sensors have been used in seat belt systems for a number of years. Examples of such a seat occupant sensor are disclosed within the following U.S. Pat. Nos.: 4,107,645 entitled "Seat Belt System with Starter Engine Lock and Alarm" which issued to Lewis et al. on Aug. 15, 1978; 3,859,485 entitled "Occupant Sensor Seat Switch" which issued to Blinkilde et al. on Jan. 7, 1975; 3,845,261 entitled "Occupant Sensor Seat Switch with Deformable Conductive Spacer Pads" which issued to Blinkilde on Oct. 29, 1974; 3,761,658 entitled "Load Responsive Switch" which issued to Loose et al. on Sep. 25,1973; and, 3,715,541 entitled "Cushion Seat Switch Sensor Means" which issued to Koenig on Feb. 6, 1973; the disclosures of which are all incorporated by reference herewithin. While seat sensors have proven effective in detecting a person occupying a seat, these conventional sensors have not been employed in combination with a convertible roof for preventing inadvertent destruction thereof upon retraction.

In accordance with the present invention, a preferred embodiment of a sensor system is located in a storage compartment of an automotive vehicle for preventing full retraction of a convertible roof when an undesired object is detected within the storage compartment. In one aspect of the present invention, a sensor employs a pair of nominally separated conductive layers. This sensor construction transmits an electrical signal when the weight of an undesired object places the conductive layers in electrical contact or moved toward each other. A further aspect of the present invention provides a sensor system capable of transmitting and receiving waves. In another aspect of the present invention, an electric roof motor is controlled by an electrical control unit which operates the motor responsive to a signal transmitted by a sensor coupled thereto. In yet another aspect of the present invention, a method of using and a method of retrofitting an automotive vehicle with a convertible roof and an object sensor system is provided.

The sensor system of the present invention is advantageous over traditional systems. For example, a sensor of the present invention prevents inadvertent damage to a convertible roof upon retraction thereof. Furthermore, a sensor of the present invention can detect objects as small and light weight as a golf ball. The present invention sensor system is also advantageous in that it takes up a minimal amount of packaging space within a storage compartment. Moreover, the present invention sensor system controls an electromagnetic device through an electrical control unit. Additional advantages and features of the present invention will become apparent from the following description and appended claims, taken in conjunction with the accompanying drawings.

BRIEF DESCRIPTION OF THE DRAWINGS

FIG. 1 is a perspective view showing a preferred embodiment of a sensor of the present invention;

FIG. 2 is an exploded perspective view showing a preferred embodiment sensor system of the present invention employing the sensor of FIG. 1;

FIG. 9 is an electrical schematic diagram showing the preferred embodiment sensor system of the present invention employing the sensor of FIG. 1;

FIG. 10 is atop elevational view showing leads extending from the preferred embodiment sensor of the present invention of FIG. 1;

FIG. 11 is a electrical schematic diagram showing the electrical operation of the preferred embodiment sensor of the present invention of FIG. 1;

DETAILED DESCRIPTION OF THE PREFERRED EMBODIMENT

Figure 3:
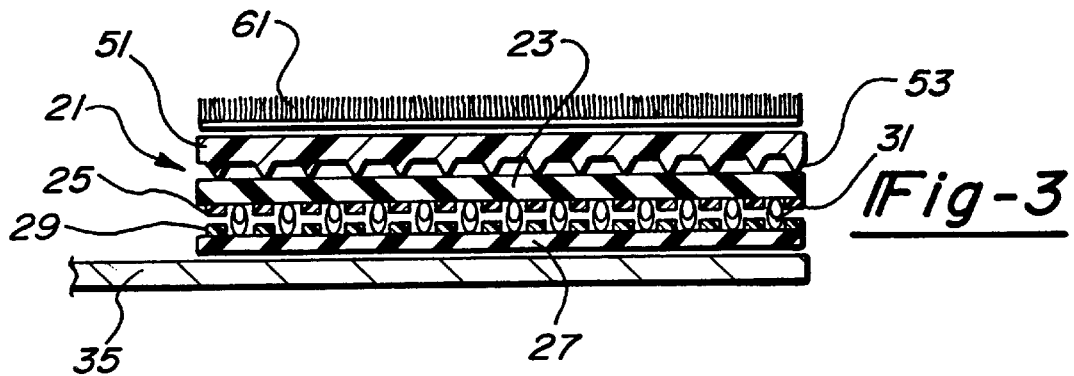
FIG. 3 sectional view, taken along line 3—3 of FIG. 1, showing the preferred embodiment sensor system of the present invention.

In accordance with the present invention, the preferred embodiment of a storage compartment sensor system is employed in an automotive vehicle having a convertible roof. In this preferred embodiment, the convertible roof is a two-part hard-top roof variety which is operated by a linkage and electric motor system. The present invention sensor system prevents full retraction of the convertible roof into a storage compartment when a sensor detects an undesired object located therein. This prevents inadvertent damage to the convertible roof upon retraction. The undesired object can be defined as any non-vehicle object remaining in the storage compartment prior to roof retraction. The sensor system includes a sensor, materials covering and supporting the sensor, an electrical control unit and an electrical circuit interacting therewith.

Referring to FIGS. 1-4, a preferred embodiment sensor 21 consists of an upper mylar sheet 23 having an electrical conductor 25 silkscreened or otherwise printed on the inside thereof, a lower mylar sheet 27 having an electrical conductor 29 silkscreened or otherwise printed on a top surface thereof, and a soft rubber substantially nonconductive material 31 silkscreened or placed on top of conductor 29 and mylar sheet 27. Mylar sheets 23 and 27 are generally flexible such that when they are adhered together upper conductor 25 can be depressed through voids 33 within nonconductive material 31 so as to electrically contact lower conductor 29. Upper and lower conductors 25 and 29, respectively, are made from a highly conductive noncorrosive material such as a tin and silver alloy.

Sensor 21 must operate on an automotive input voltage between 8 and 24 volts, dc, and be capable of switching a minimum amperage of 25 ma. The sensor is capable of detecting a 3.6 ounce minimum actuation force or weight necessary to cause electrical contact between the conductors. This simulates a golf ball sized and weighted object. The conductive layers must have a maximum contact resistance of 50 ohms with an open resistance greater than $10^6$ ohms. Sensor 21 must operate within a temperature range of −40° Celsius to 85° Celsius and having a cycling life greater than 20,000 cycles. Such a sensor can be purchased from The Hall Co. of Urbana, Ohio.

Lower mylar sheet 27 is adhered or otherwise bonded to a hard masonite floor board 35 which is positioned against a floor 37 of a storage compartment 39. In this embodiment, storage compartment 39 is defined as the trunk area of the automotive vehicle. In a general sense, a seat back panel 41 separates trunk 39 from a passenger compartment 43. Of course, the storage compartment may take the form of any area where the convertible roof can be stowed. A pressure point enhancement layer 51 is made from a mylar or polycarbonate type material having pressure enhancement contours such as bumps 53 formed or molded therein. Pressure point enhancement layer 51 is juxtapositioned on top of upper mylar sheet 23 such that bumps 53 are preferably aligned with conductors 25 and 29. Pressure point enhancement layer 51 serves to localize pressures and multiply the effective weight of a flat object such that sensor 21 can detect the weight thereof. Pressure point enhancement layer 51 is adhered or otherwise bonded to sensor 21 as is a carpet 61 aesthetically mounted thereabove.

Figure 4:
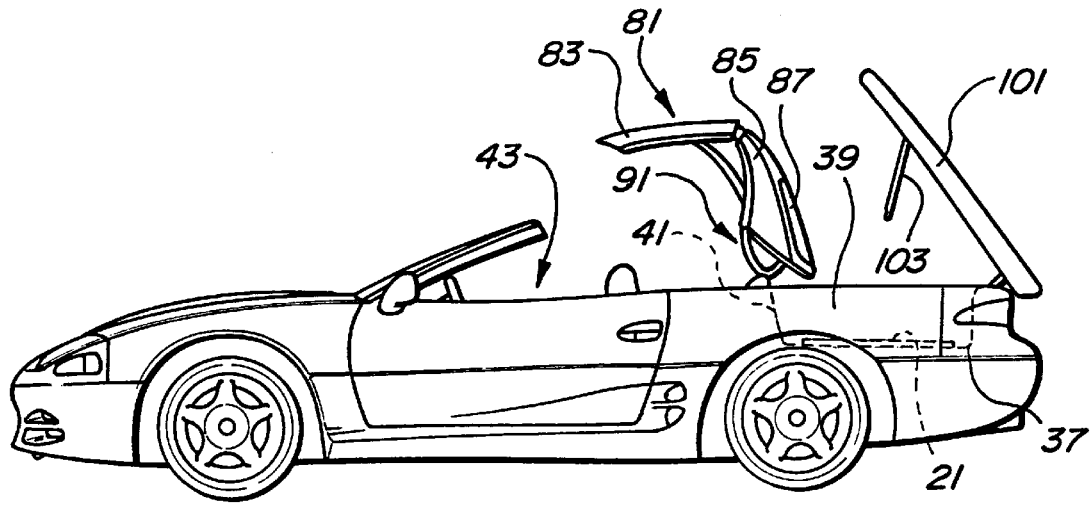
FIG. 4 is a side elevational view showing the preferred embodiment sensor system employed in a preferred embodiment automotive vehicle of the present invention.
Figure 5:
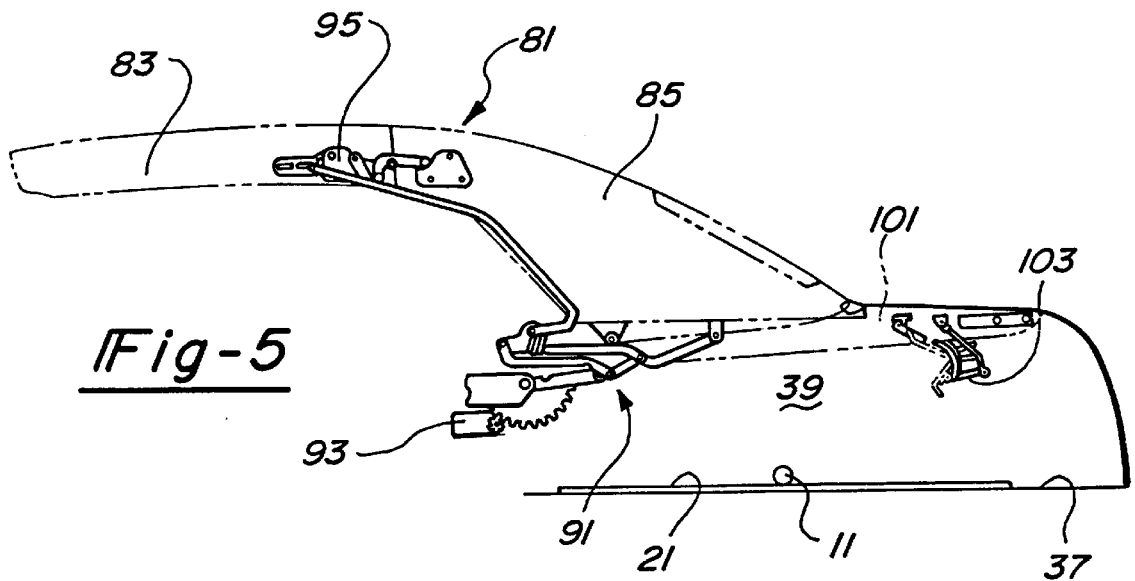
FIG. 5 is a side elevational view of a preferred embodiment convertible roof of FIG. 4, shown in a raised position.
Figure 6:
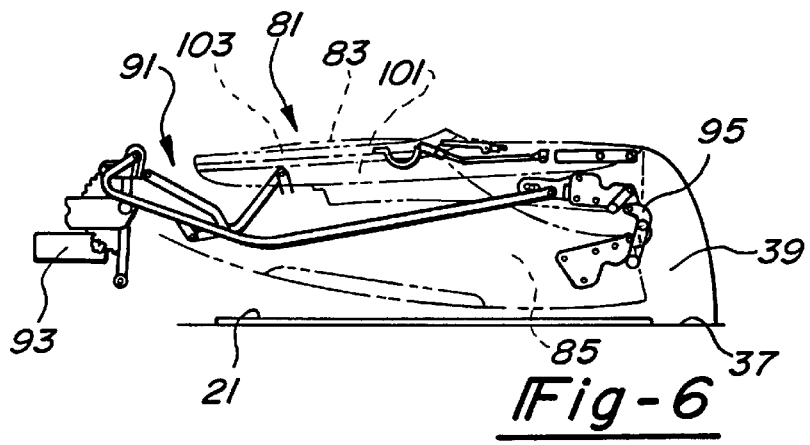
FIG. 6 is a side elevational view of the preferred embodiment convertible roof of FIG. 4, shown in a fully retracted position.

A preferred embodiment convertible roof 81 is shown in FIGS. 4–6. Convertible roof 81 includes an entirely rigid front roof section 83 and an entirely rigid rear roof section 85 containing a glass backlite 87 and retractable quarter window (not shown). A linkage assembly 91 and a fractional horsepower dc electric motor 93 serve to lift and rotate convertible roof 81 from a raised position (FIG. 5) to a fully retracted position (FIG. 6). Rear roof section 85 is pivotably inverted and front roof section 83 is folded in a clamshell manner about a hinge 95 when convertible roof 81 is fully retracted. A decklid panel 101 containing a pair of collapsible and extensible flippers or extension members 103 pivots about a rear tail panel of the automotive vehicle and serves to act as a tonneau cover against convertible roof 81. Sensor 21 is disposed along floor 37 of trunk 39 so as to detect an undesired object 111 such as golf clubs, spare tires, brief cases, golf balls, or the like. Other preferred embodiment convertible roofs may be driven by more conventional motor operated hydraulic pump and linkage mechanisms.

Figure 7:
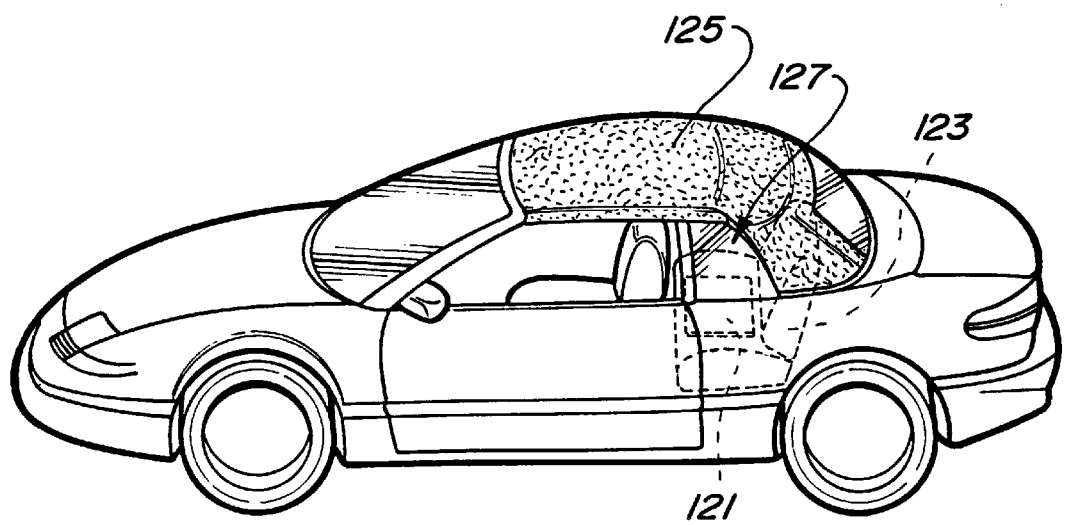
FIG. 7 is a perspective view showing an alternate embodiment sensor system employed in an alternate embodiment automotive vehicle of the present invention.

A first alternate embodiment sensor system and convertible roof is shown in FIG. 7. In this embodiment, a sensor 121 of the type employed with the preferred embodiment, is disposed within a rear seat 123. A convertible roof 125, here shown as a conventional soft-top roof is retractable into a storage space 127 defined at least in part above rear seat 123. A variation of the embodiment folds a substantially vertical back portion of rear seat 123 horizontally forward with sensor 121 positioned on the uppermost folded surface thereof. For this application, the preferred sensor heretofore discussed is advantageous over traditional seat belt occupancy detectors since the present invention employs a sensor capable of detecting a golf ball sized and weighted object which could damage a convertible roof.

Figure 8:
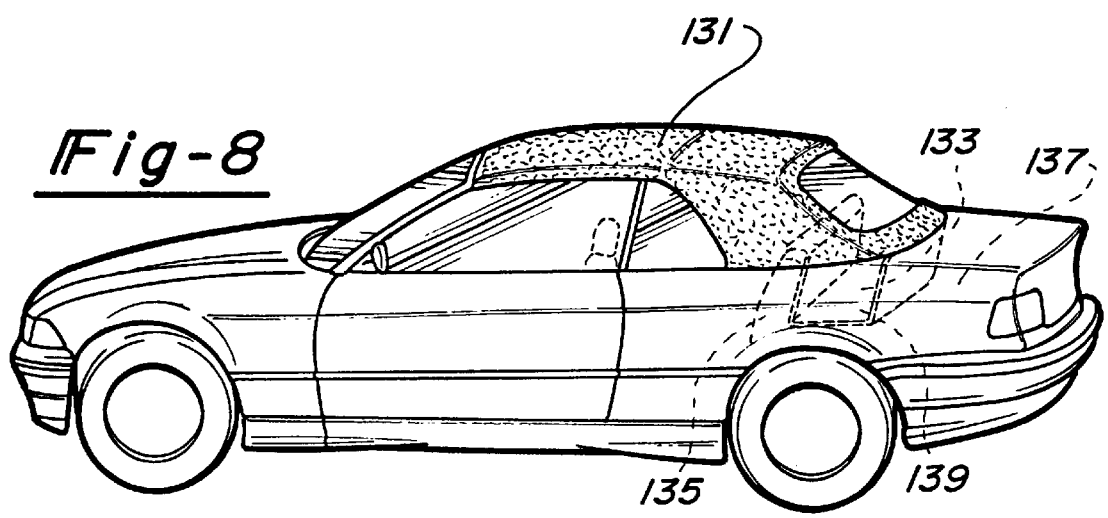
FIG. 8 is a perspective view showing a second alternate embodiment sensor system employed in a second alternate embodiment automotive vehicle of the present invention.

A second alternate embodiment sensor system and convertible roof is illustrated in FIG. 8. In this embodiment, a soft-top convertible roof 131 is retractable into a storage compartment 133 located rearward of a rearmost seat 135 but forward of a trunk 137. A sensor 139 is positioned within storage compartment 133 along its floor and even possibly along its vertical walls.

Figure 13:
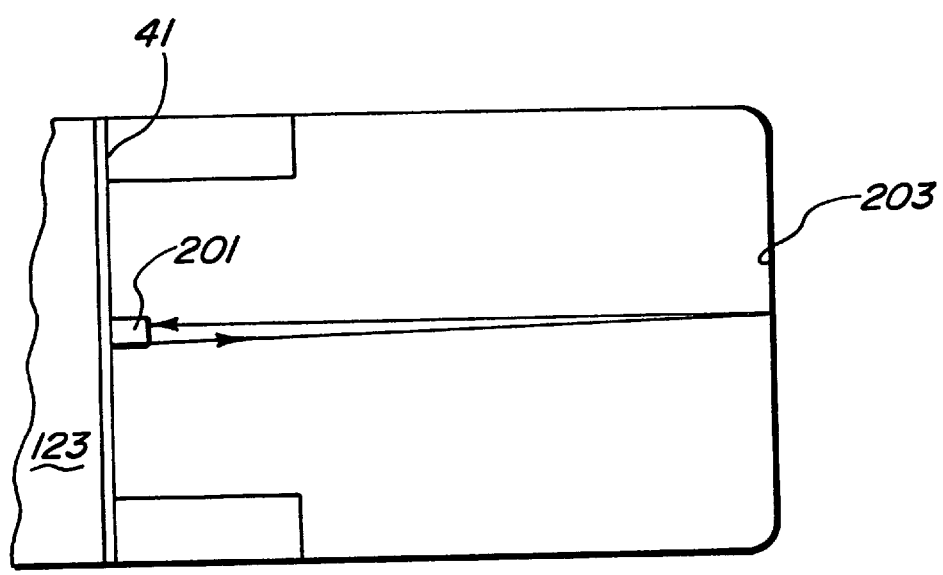
FIG. 13 is fragmentary top diagrammatic view showing a third alternate embodiment sensor of the present invention within a trunk of an automotive vehicle.

Other alternate embodiments employ different types of sensors within the storage compartment. Referencing FIG. 13, a proximity, ultrasonic, infrared, optical or magnetic sensor 201 is positioned within a trunk 203 rearward of a seatback panel 41. These otherwise conventional sensors transmit a magnetic wave field, sound wave or light wave beam which, normally bounces off of the vehicle panels such as the tail, quarter and floor pan panels. The wave is received or detected by sensor 201 which utilizes an electrical control unit to calculate its magnetic value, return time, distance, or integrity. It may be desirable to further rotate sensor 201 from side-to-side within trunk 203. The electrical control unit is provided with a different signal when the wave received by sensor 201 is interrupted or changed from the nominal value by an undesired object in its path. A separately located wave receiver can also be employed.

A further alternate embodiment sensor uses a capacitive sensor which appears similar to the sensor illustrated in FIGS. 1–3. However, this alternate sensor can be more sensitive than the preferred embodiment. With the present embodiment, an electrical control unit measures and compares the capacitive distance or gap between conductive layers before and during depression by an undesired object. Depression moves at least one of the conductive layers toward the other. Full electrical contact between conductive layers is not necessary. However, barometric pressure and temperature variations must be accounted for.

Referring again to the preferred embodiment system of FIGS. 9–11, an electrical control unit such as a microprocessor 161 is electrically coupled to sensor 21 through electrical connectors 163 and 165. Among other functions, microprocessor 161 serves to control roof motors 93 as a function of a driver operated switch, position sensing potentiometers, sensor 21 and other optional features. An example of such a driver operated button is disclosed within U.S. Pat. No. 5,225,747 entitled "Single-Button Actuated Self-Correcting Automatic Convertible Top" which issued to Helms et al. on Jul. 6, 1993, the disclosure of which is incorporated by reference herewithin. Electrical control unit 161 may alternately take the form of a Field Effect Transistor, an Isolated Gate Bata Transistor or a Bipolar.

A lead 167 extends from sensor 21 to connector 163. Lead 167 contains a first pin 169, a second pin 171 and a third pin 173. First and second pins, respectively 169 and 171, are electrically coupled to one another for providing a constant path current or short-type situation to send a signal which informs microprocessor 161 if sensor 21 is connected thereto. When an object is detected upon sensor 21, upper conductor 25 electrically contacts with lower conductor 29. This operates as a normally open single pole, single throw switch 175 which, in turn, provides a signal to microprocessor 161.

Figure 12:
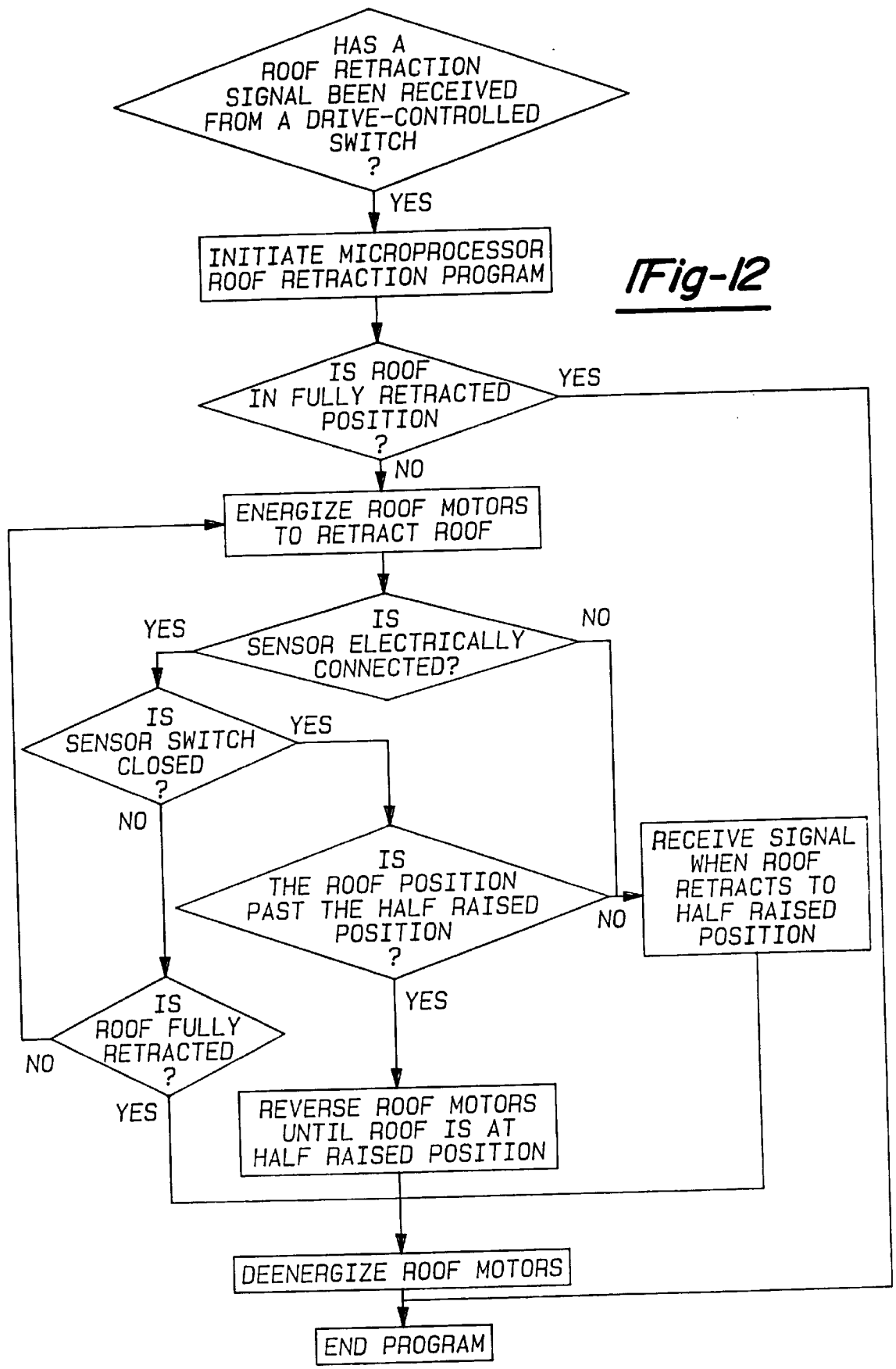
FIG. 12 is a diagrammatic flow chart showing the interaction of a microprocessor of the preferred embodiment sensor system of the present invention employing the sensor of FIG. 1.

The interaction between the sensor, microprocessor and roof motors is diagrammatically shown in FIG. 12. If the undesired object is not detected by the sensor then the convertible roof is allowed to be fully retracted into the storage compartment. If the object is detected by the sensor when the convertible roof is between the raised position and an approximately half raised position then the convertible roof is retracted to the approximately half raised position and then the motors and retraction are stopped. If the sensor is not electrically coupled to the microprocessor then the microprocessor will act as if an object were detected within the storage compartment. If the object is detected when the convertible roof is between the generally half raised position then the motors and retracting movement is reversed such that the convertible roof is stopped in the substantially half raised position; this allows the vehicle occupant to remove the undesired object and reactuate the driver operated button. If the weight of the undesired object is too light to be detected, then the convertible roof will retract until a portion of the roof lightly presses the object into the sensor at a force which can be detected; at this point, the motors and retracting movement of the convertible roof is reversed and stopped at the substantially half raised position.

While various embodiments of the sensor system and convertible roofs have been disclosed, it will be appreciated that various modifications may be made without departing from the present invention. For example, the membrane switches of U.S. Pat. Nos. 4,515,999 which issued to Harper; 4,489,302 which issued to Eventoff; and 4,423,294 which issued to Walser et al., can also be employed herewith, and the disclosures of which are incorporated by reference herewithin. Conventional piezo-electric, electrochemical, resilient and electrically conductive pads, and even copper stampings with spacers or springs therebetween can be employed within the present invention sensor system. Magnetic, optical, infrared, ultrasonic, pressure, capacitive, doppler and proximity sensors, known within the art, can also be interchangeably used within the present invention system. Furthermore, a variety of other convertible roofs, linkage mechanisms and tonneau covers can be incorporated in combination with the present invention sensor system. The present invention further encompasses a sensor used to move or otherwise operate an electromagnetic device, such as a solenoid, to block or prevent full retraction of a manual or powered convertible roof. Of course, a normally closed switch sensor which send a signal upon or during opening is considered as part of the present invention system. Various materials have been disclosed in an exemplary fashion, however, various other materials may of course be employed. It is intended by the following claims to cover these and any other departures from the disclosed embodiments which fall within the true spirit of this invention.

The invention claimed is:

1. In combination, a sensor system and an automotive vehicle, said combination comprising:

a storage compartment disposed substantially behind a rearmost passenger seat of said automotive vehicle;

a convertible roof movable from a raised position covering a passenger compartment of said automotive vehicle to a fully stowed position within said storage compartment; and a sensor located in said storage compartment preventing said convertible roof from becoming fully stowed so as to deter said convertible roof from contacting an undesired object in said storage compartment.

2. The apparatus of claim 1 wherein said convertible roof includes an entirely rigid front roof section.

3. The apparatus of claim 2 wherein said convertible roof further includes an entirely rigid rear roof section.

4. The apparatus of claim 3 wherein upon retraction of said convertible roof, a forwardmost portion of. said rear roof section rotates rearwardly while said rear roof section is pivotally inverted, said front roof section simultaneously folds in a clam shell manner against said rear roof section such that interior surfaces of said roof sections are substantially facing each other when in said fully stowed position.

5. The apparatus of claim 3 further comprising a motor operated hydraulic pump and linkage mechanism moving said convertible roof from said raised position to said stowed position.

6. The apparatus of claim 1 further comprising:

a linkage system for supplying movement to said convertible roof; and an electromagnetic device electrically connected to said sensor so as to prevent said linkage system from completely moving said convertible roof to said fully stowed position when said sensor detects said undesired object in said storage compartment.

7. The apparatus of claim 6 further comprising an electrical control unit disposed within said automotive vehicle receiving an electrical signal from said sensor through said electrical connection, said electrical control unit further being electrically coupled to said electromagnetic device for controlling the movement thereof.

8. The apparatus of claim 7 further comprising a connecting electrical circuit means for providing a constant electrical closed path signal to said electrical control unit to indicate that said sensor is connected thereto, so that if said connecting electrical circuit means does not provide said connecting signal then said electrical control unit will act as if said undesired object was sensed in said storage compartment.

9. The apparatus of claim 6 wherein said electromagnetic device is a fractional horsepower electric motor which actuates said linkage system mechanically connected thereto.

10. The apparatus of claim 1 which operates as follows:
   (a) if said undesired object is not detected then said convertible roof is allowed to be fully retracted into said storage compartment;
   (b) if said undesired object is detected by said sensor when said convertible roof is between said raised position and an approximately half raised position then said convertible roof is retracted to said approximately half raised position and retraction is subsequently stopped;
   (c) if said undesired object is detected when said convertible roof is between said approximately half raised position and said fully stowed position then retracting movement is reversed and said convertible roof is stopped in said approximately half raised position; and
   (d) if said weight of said undesired object is too light to be detected then said convertible roof will retract until it presses said undesired object at a force which can be detected, at which point retracting movement of said convertible roof is reversed and subsequently stopped at said approximately half raised position.

11. The combination of claim 1 wherein said sensor includes:
   a first electrical conductor;
   a second electrical conductor disposed adjacent and substantially parallel to said first electrical conductor;
   a substantially nonconductive material disposed between portions of said electrical conductors, said substantially nonconductive material having at least one void;
   said first electrical conductor suitable for being flexed to depress through said at least one void of said substantially nonconductive material so as to electrically contact said second electrical conductor in response to the weight of said undesired object detected in said storage compartment;
   a first sheet being flexible, said first conductor being affixed to said first sheet; and
   a second sheet, said second conductor being affixed to said second sheet, said sheets being attached to each other.

12. The apparatus of claim 1 wherein said sensor is positioned upon a rigid floor panel removably located within said storage compartment.

13. The apparatus of claim 1 further comprising a carpet positioned to cover said sensor.

14. The apparatus of claim 1 wherein said storage compartment is defined as being located substantially within a trunk of said automotive vehicle.

15. The apparatus of claim 1 wherein said storage compartment is defined as being located substantially rearward of a rearmost passenger seat but forward of a trunk.

16. The apparatus of claim 1 wherein said storage compartment is defined at least in part by an area immediately above a rear passenger seat.

17. The apparatus of claim 1 wherein said undesired object is a golf ball.

18. The apparatus of claim 1 wherein said sensor is a capacitive type sensor.

19. The apparatus of claim 1 wherein said sensor is a magnetic type sensor.

20. The apparatus of claim 1 wherein said sensor is an optical type sensor.

21. The apparatus of claim 1 wherein said sensor is an infrared type sensor.

22. The apparatus of claim 1 wherein said sensor is an ultrasonic type sensor.

23. The apparatus of claim 1 wherein said sensor is a proximity type sensor.

24. The apparatus of claim 1 wherein said sensor is further defined as a pair of electrical conductors with a spacer therebetween, said sensor transmits a signal upon physical and electrical contact of said pair of electrical conductors.

25. The apparatus of claim 1 further comprising:
   a linkage system for supplying movement to said convertible roof; and
   a powered actuator being electrically coupled to said sensor so as to prevent said linkage system from completely moving said convertible roof to said fully stowed position when said sensor detects said undesired object in said storage compartment.

26. The apparatus of claim 1 wherein said sensor is an electric switch.

27. In combination, a sensor system and an automotive vehicle having a convertible roof and a trunk, said combination comprising:
   a linkage system for supplying movement to said convertible roof;
   an actuator for driving said linkage system; and
   an electric device disposed in said trunk for electrically controlling said actuator in response to the determined internal state of said trunk;
   said actuator being electrically coupled to said device and preventing said linkage system from moving said convertible roof to a stowed position when an undesirable object is present in said trunk.

28. The combination of claim 27 further comprising:
   an electromagnetic device; and
   a microprocessor being disposed in said automotive vehicle receiving a signal from said electric device, said microprocessor further being electrically coupled to and controlling the movement of said electromagnetic device.

29. The combination of claim 27 comprising a hydraulic pump actuating said linkage system; and
   said pump being electrically coupled to said electric device so as to prevent said linkage from completely moving said convertible roof to a fully stowed position when said electric device detects said undesired state of said trunk.

30. The apparatus of claim 27 wherein said convertible roof includes an entirely rigid front roof section.

31. The apparatus of claim 30 wherein said convertible roof further includes an entirely rigid rear roof section.

32. The apparatus of claim 31 wherein upon retraction of said convertible roof, a forwardmost portion of said rear roof section rotates rearwardly while said rear roof section is pivotally inverted, said front roof section simultaneously folds in a clam shell manner against said rear roof section such that interior surfaces of said roof sections are substantially facing each other when in said fully stowed position.

33. The combination of claim 27 further comprising a decklid pivotable about a rear portion of said trunk to allow said convertible roof to move to said stowed position, said device being disposed below said decklid in said trunk.

34. The combination of claim 33 wherein:
   said convertible roof includes a rigid front roof section and a rigid rear roof section; and upon retraction of said convertible roof, a forwardmost portion of said rear roof section rotates rearwardly while said rear roof section is pivotally inverted, said front roof section simultaneously folds in a clam shell manner against said rear roof section such that interior surfaces of said roof sections are substantially facing each other when in said fully stowed position.

35. The apparatus of claim 34 further comprising a motor operated hydraulic pump and said linkage mechanism moving said convertible roof from said raised position to said stowed position.

36. The combination of claim 27 wherein said device is disposed substantially below said convertible roof when said convertible roof is stowed in said trunk.

37. A method of controlling an automotive vehicle convertible roof relative to a storage compartment by using a sensor and a driver-controlled switch, said method comprising the steps of:

(a) receiving a signal from said driver-controlled switch;

(b) determining whether an undesired storage compartment condition exists in response to an indication from said sensor disposed in said storage compartment;

(c) moving said convertible roof from a fully raised position to a retracted position in said storage compartment if a desired storage compartment condition exists; and (d) preventing said convertible roof from fully retracting if said undesired storage compartment condition exists.

38. The method of claim 37 further comprising the steps of:

(a) determining the position of said convertible roof;

(b) energizing an actuator for retracting said convertible roof;

(c) determining whether said convertible roof has retracted past a half raised position;

(d) reversing actuation of said actuator; and (e) deenergizing said actuator when said convertible roof reaches substantially said half raised position.

39. The method of claim 37 further comprising the steps of:

(a) transmitting a wave;

(b) receiving said wave in a nominal manner;

(c) receiving said wave in a changed manner due to said wave encountering said undesired object; and (d) providing a signal to an electrical control unit upon receiving said wave in a changed manner.

40. The method of claim 37 further comprising the steps of:

(a) depressing a first electrical conductor by weight placement thereon of an undesired object; and (b) detecting differences of said transmitted by an interaction of said first electrical conductor with a second electrical conductor.

41. The method of claim 37 further comprising the step of folding a rigid front roof section of said convertible roof against a rigid rear roof section of said convertible roof in a clamshelling manner if said sensor indicates that said desired storage compartment condition exists.

42. The method of claim 41 further comprising the steps of pivoting a decklid about a rear pivot to allow entry of said convertible roof into said storage compartment, moving said convertible roof into a trunk after pivoting of said decklid.

43. The method of claim 37 further comprising the step of providing said sensor substantially below said convertible roof when said convertible roof is stowed in a trunk.

44. The method of claim 37 further comprising the step of transmitting a signal from said sensor to an electronic control unit indicating the condition of said storage compartment.

45. A method of controlling a convertible roof of an automotive vehicle, said vehicle having a sensor, a trunk, a decklid and an electronic control unit, said method comprising the steps of:

(a) positioning said sensor in said trunk substantially below said convertible roof when said convertible roof is stowed in said trunk;

(b) using said sensor to change the flow of electricity to said electronic control unit indicating the internal condition of said trunk;

(c) determining whether an undesired internal trunk condition exists in response to step (b);

(d) moving said convertible roof from a fully raised position to a retracted position in said storage compartment if a desired internal trunk condition exists;

(e) preventing said convertible roof from becoming stowed in said trunk if said undesired internal trunk condition exists;

(f) folding a rigid front roof section of said convertible roof against a rigid rear roof section of said convertible roof in a clamshelling manner if said sensor indicates that a desired internal trunk condition exists;

(g) openly pivoting said decklid about a rear pivot to allow entry of said convertible roof into said trunk; and (h) moving said convertible roof into said trunk after openly pivoting of said decklid if said sensor indicates that a desired internal trunk condition exists.

\* \* \* \* \*

UNITED STATES PATENT AND TRADEMARK OFFICE
CERTIFICATE OF CORRECTION

PATENT NO. : 5,864,214
DATED : January 26, 1999
INVENTOR(S) : Steven L. Brodsky

It is certified that error appears in the above-identified patent and that said Letters Patent is hereby corrected as shown below:

On the Title Page, in the title, after, "VEHICLE" insert -- CONVERTIBLE ROOF --.

On the Title Page under U.S. Patent Documents, reference 2,007,873, "Pulin" should be -- Paulin --.

On the Title Page under U.S. Patent Documents, reference 5,228,562, "Bulk" should be -- Burk --.

Column 1, line 3, after "VEHICLE" insert -- CONVERTIBLE ROOF --.

Column 2, line 62, "atop" should be -- a top --.

Column 2, line 65, "a" should be -- an --.

Column 3, line 5, after "is" insert -- a --.

Column 6, line 35, after "of" delete -- . --.

UNITED STATES PATENT AND TRADEMARK OFFICE
CERTIFICATE OF CORRECTION

PATENT NO. : 5,864,214
DATED : January 26, 1999
INVENTOR(S) : Steven L. Brodsky

It is certified that error appears in the above-identified patent and that said Letters Patent is hereby corrected as shown below:

Column 8, line 14, delete "being".

Column 8, line 46, after "linkage" insert -- system --.

Column 10, line 3, after "said" insert -- signal --.

Signed and Sealed this

Seventh Day of September, 1999

Attest:

Q. TODD DICKINSON

Attesting Officer

Acting Commissioner of Patents and Trademarks